April 28, 1931.   S. B. HENDRICKS   1,802,556
EARTH WORKING IMPLEMENT
Filed Aug. 22, 1928
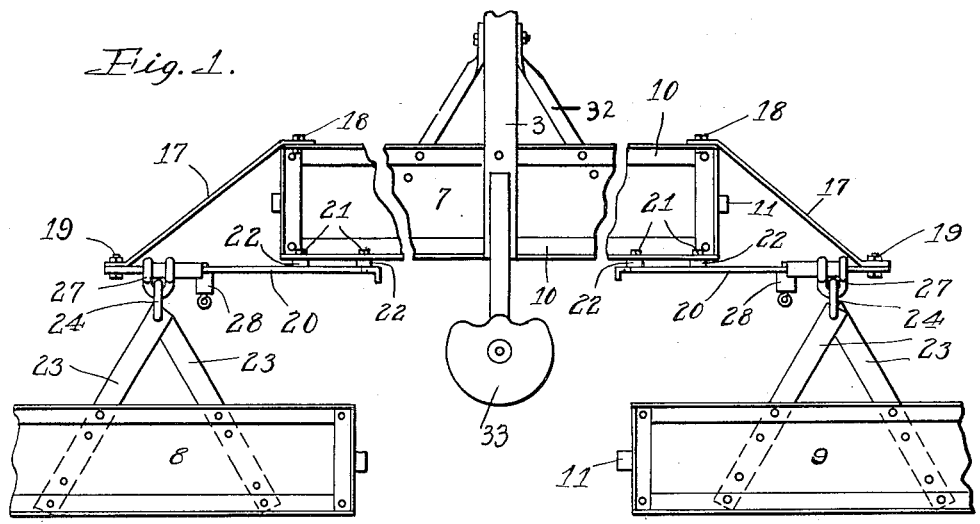
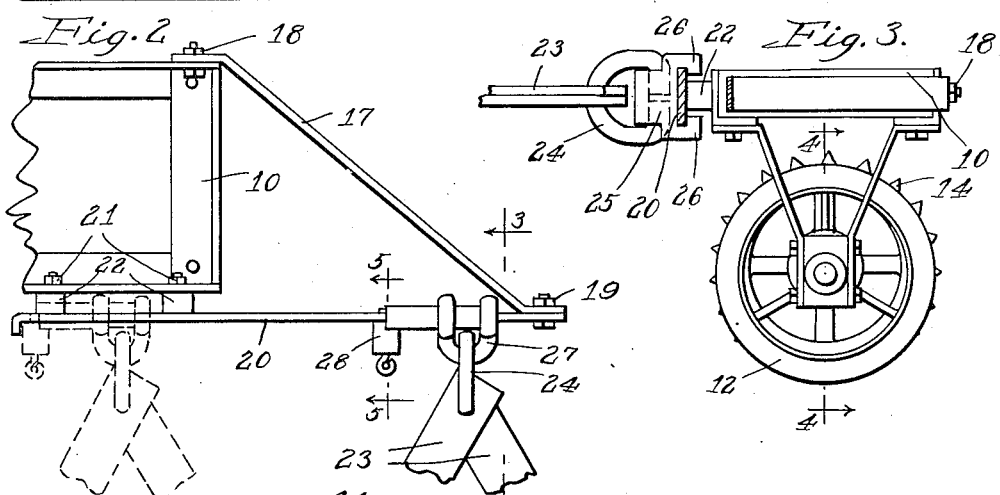
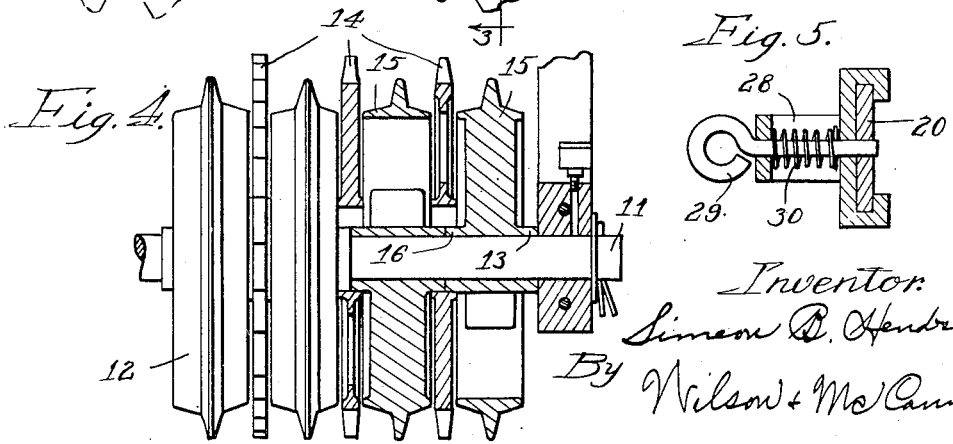

Patented Apr. 28, 1931

1,802,556

UNITED STATES PATENT OFFICE

SIMEON B. HENDRICKS, OF ROCKFORD, ILLINOIS, ASSIGNOR TO J. I. CASE COMPANY, OF RACINE, WISCONSIN, A CORPORATION OF WISCONSIN

EARTH-WORKING IMPLEMENT

Application filed August 22, 1928. Serial No. 301,276.

My invention relates to earth working machinery and more particularly to that kind of machines known as soil packers and mulchers, having a plurality of packing and mulching discs or wheels.

One object of my invention is to provide a land roller and packer which may be manufactured at a relatively low cost, have a long life, and produce improved results.
Another object of my invention is to provide an improved mounting of packer and mulcher wheels whereby the pressure on the wheels will be transmitted evenly to the axle and the mulcher wheels will be mounted through a large opening at their centers upon the hubs of the packer wheels.

A still further object of my invention is to provide a tandem implement such that the units traveling to the rear and sides of the front unit may be easily caused to take a position in the rear directly trailing the front unit whereby the implement may be the more readily passed through gates and other narrow openings while in transit, or used as a double roller.

Having these and other objects in view the invention consists in the novel construction, combination, and arrangement of parts as described and claimed.
Reference is to be had to the accompanying drawings in which—

Figure 1 is a top view of an implement embodying my invention;

Fig. 2 is a top view of one end of the front unit showing the draft bracket and the slidable connecting member in its operative or extended position, the dotted lines indicating the inoperative position;

Fig. 3 is a cross-sectional elevation along the line 3—3 of Fig. 2 showing the bar along the rear of the front unit and the sliding member;

Fig. 4 is a fragmentary elevation showing a portion of a gang of wheels, partially in section along the line 4—4 of Fig. 3; and Fig. 5 is a cross-section of the sliding member taken on the line 5—5 of Fig. 2.

The implement consists essentially in a forward unit designated generally by 7 and trailing or rear units arranged in stepped relation and designated generally by 8 and 9. It will, of course, be understood that in certain phases of my invention the rear units are not required and that the front unit may comprise the complete implement.

The front unit comprises a frame designated generally by 10, a tongue 3 fastened to the frame by rods 32, a seat 33 connected to the tongue, and an axle 11 supported from said frame, upon which is mounted a series of packer wheels. According to my invention each packer wheel has hubs 13 extending on each side equally beyond the rest of the wheel so that when mounted upon the axle hub to hub as shown in Fig. 4 an intervening space remains between successive wheel rims 15. This construction permits of a single type of packer wheel throughout and in addition causes the pressure at the periphery of the wheel to be transmitted evenly along the bearing. The mulcher wheels 14 are mounted in the spaces between the packer wheel rims and turn about the extended portions of two adjacent packer wheel hubs 16 as an axle. The mulcher wheels are designed to fit very loosely upon these hub-axles the internal diameter of the mulcher wheel openings being considerably larger than the external diameter of the hubs upon which they run. This permits the wheel to closely follow the contour of the earth surface and also to move without a fixed plane of rotation. The openings should, however, be of such size as to bear against the hubs when the mulcher wheel teeth next to the ground lie approximately even with the central ribs of the packer wheels whereby they are forced into the ground to the same depth as the packer wheel, as shown in Fig. 4. The mulcher wheels are greater in diameter than the packer wheels, causing a differential in the speed of rotation which prevents the wheels from clogging on damp and sticky soils.

A draft bracket is attached at each end of the front unit, the bar 17 being attached to the front corner of the frame at 18 and extending outward and backward to meet the rear arm at 19. The rear arm 20 is attached along the rear of the frame and extends outward to meet the front arm. The rear arm is attached to the frame by bolts 21 and that portion lying along the side of the frame is held at a distance by bushings 22 around the bolts.

The rear units are substantial duplicates of the front unit with the exception of the draft brackets. In addition a draft bar is attached which comprises the two flat metal bars 23 fastened to the lower side of the frame and extending forward to converge at the ring or loop 24 which passes through both bars binding them together and connecting them to the slidable connecting member. This member consists of a part 25 lying parallel to the bar 20 with its edges 26 extending over and around the sides of the bar equipped at one end with the reenforced eye 27 and at the other end with a locking means 28 shown in detail in Fig. 5. Here pin 29 passes through the sliding member and is held against the arm of the draft bracket by a spring 30 which forces the pin through a hole in the arm when the member is brought to the proper position. Lateral movement of the sliding member is hereby effectively prevented until the pin is withdrawn.

It will be evident that in its operation my invention is novel and highly efficient, offering a number of distinct advantages. The packer wheels are designed to move over the ground under the weight of the frame and operator. Under this weight, or additional weight, which may be added, the peripheral ribs of the packer wheels are forced into the ground, and as they are drawn forward tend to cut and break the larger lumps of soil. In addition the weight on the packer wheels causes the surface to become packed and eliminates large air pockets near the surface. The peripheral rib causes the surface to assume a corrugated appearance but the mulcher wheel, passing along the ridge formed between two adjacent packer wheels, reduces the soil to fine particles and distributes it loosely over the surface between the packer wheels thus forming an insulating layer for the purpose of retaining the earth's moisture.

In order that the mulcher wheels may best serve their purpose they are made larger in diameter than the packer wheels. This construction produces two distinct results. Due to the increased resistance of the earth and the large hub opening the mulcher wheel lags behind its neighboring packer wheels, causing the mulching or pulverizing process to distinctly follow the packing process. Due to the difference in size between the mulcher wheel and its adjacent packer wheels there is a difference in their speed of rotation which prevents the clogging of the roller in damp and sticky soils.

Where the soil is particularly rough and obstinate the rear sections may be easily caused to take a position directly trailing the front unit whereby a double packing and mulching effect is obtained. This movable feature is also valuable when the implement is in transit since it may be passed through gates and along narrow road-ways with greater facility.

It will be observed that while I have shown the features of my invention applied to packers and mulchers they are also equally well adapted for use with other types of tandem implements such as harrows, and planters.

While the invention has been described in considerable detail and applied to a particular case, the description is intended as illustrative rather than limiting for the invention may be embodied in a number of implements.

I claim:

1. In a land roller, the combination of a frame, an axle supported thereby, a series of packing wheels rotatably mounted upon said axle each having a tire with a peripheral central rib and a hub extending outwardly on each side of said wheel beyond the plane of the tire in such a manner that when mounted hub to hub there remains an intervening space between the successive wheel rims, a series of mulcher wheels rotatably mounted upon the extending portions of adjoining hubs and disposed to operate loosely eccentric about the hub-axle thus formed.

2. In a tandem earth working implement, a front unit having fixedly attached at its ends laterally projecting draft members, rear units arranged in a stepped relation to the front unit each having a draft bar permanently and flexibly attached to the projecting draft members, and means for connecting each draft bar to its draft member whereby said connection may be altered between a position at the outward end of said draft member and a position at the inward end, the position of the trailing units being correspondingly altered between an operating and a traveling position.

3. In a tandem implement, a front unit having attached at its ends laterally projecting draft members, rear units arranged in a stepped relation to the front unit each having a draft bar permanently and flexibly attached to the projecting draft members, and means for connecting each draft bar to its said draft member consisting of a sliding member adapted to slide laterally on the draft member, releasable means for holding the sliding member in its fixed positions, and a flexible connection between each sliding member and its draft bar, whereby each rear unit may be caused to take either a position at the side and to the rear of the front unit or a trailing position at the rear of said front unit.

4. In a tandem implement, a front unit having attached at its ends laterally projecting draft members each consisting of two arms one attached to the front corner of the unit and extending diagonally backward to meet the second arm which is attached to the rear side of said front unit in a vertical plane to the rear thereof, and extends laterally outward to form a slide bar, rear units arranged in a stepped relation to the front unit each having a draft bar permanently and flexibly attached to the rear arms of the draft members, and means for connecting said draft members with the draft bars consisting of a sliding member adapted to engage said slide bar and slide laterally thereon, means for holding the sliding member in its fixed positions on said slide bar, and rings forming permanent flexible attachments to the draft bars of the rear units whereby the latter may be caused to take either a position at the side and to the rear of the front unit or a trailing position at the rear of said front unit.

5. In a tandem implement, a front unit, rear units arranged in a stepped relation to said front unit, slide bars parallelly attached to the rear of the front unit at each end in a vertical plane to the rear of said unit, means for slidably attaching the rear units to the bars, and means for holding said slidable means in a fixed position at either end of said bars, whereby the rear units may be caused to take either a position at the side and rear of the front unit or a trailing position at the rear of the front unit.

In witness of the foregoing I affix my signature.

SIMEON B. HENDRICKS.